United States Patent [19]

Young

[11] 4,125,071

[45] Nov. 14, 1978

[54] BALE SHAPE CONTROL MEANS

[75] Inventor: Robert G. Young, Bird-in-Hand, Pa.

[73] Assignee: Sperry Rand Corporation, New Holland, Pa.

[21] Appl. No.: 711,893

[22] Filed: Aug. 5, 1976

[51] Int. Cl.² .............................................. B30B 9/30
[52] U.S. Cl. ..................................... 100/191; 100/148
[58] Field of Search ................. 100/43, 23, 188, 189, 100/147, 148, 190–192; 56/341–343

[56] References Cited

U.S. PATENT DOCUMENTS

| 657,607 | 9/1900 | Luzatto | 100/191 X |
| 2,596,872 | 5/1952 | Skromme | 190/191 |

FOREIGN PATENT DOCUMENTS 972,562  10/1964  United Kingdom ..................... 100/192

Primary Examiner—Harvey C. Hornsby
Assistant Examiner—Timothy F. Simone
Attorney, Agent, or Firm—John B. Mitchell; Frank A. Seemar; Ralph D'Alessandro

[57] ABSTRACT

An articulated top tension rail is provided in the bale chamber of a baler for improving control over the shape of bales successively formed within and moved toward the rear discharge end of the bale chamber. A tension control device on the bale chamber disposes a rear portion of the top rail in a position in which it is spaced above and substantially parallel to a bottom rail of the bale chamber and disposes a front portion of the top rail, which is pivotally connected to the rear portion, in a position in which it rearwardly declines toward the bottom rail.

5 Claims, 9 Drawing Figures

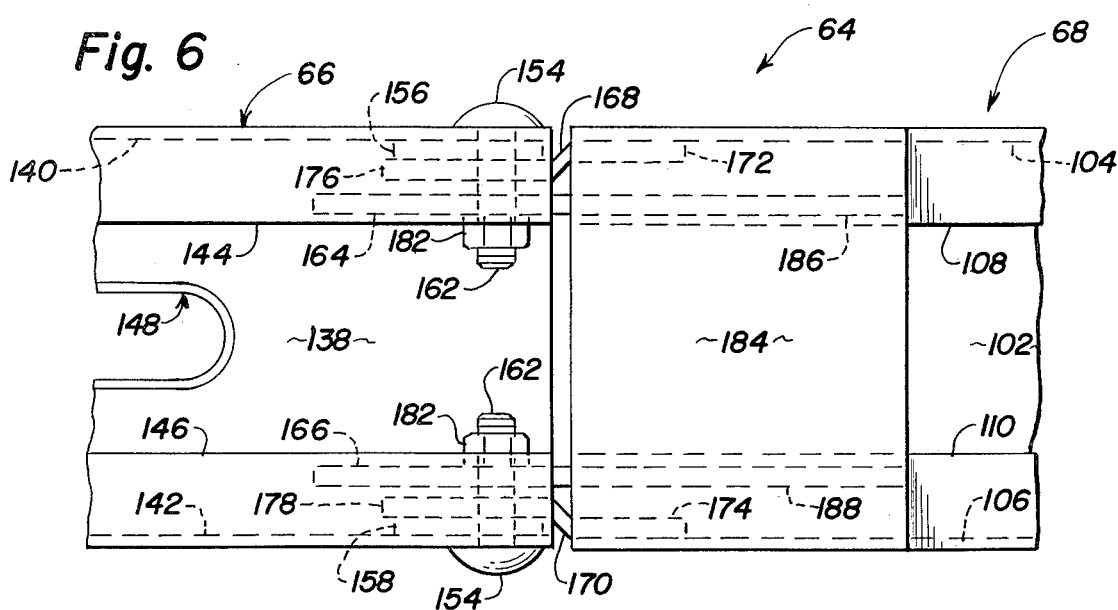
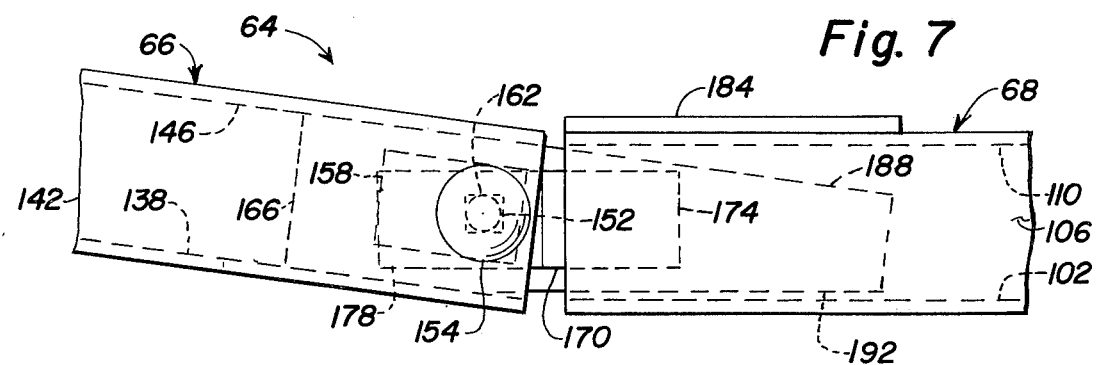
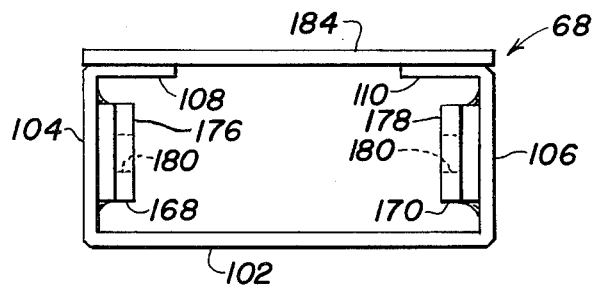
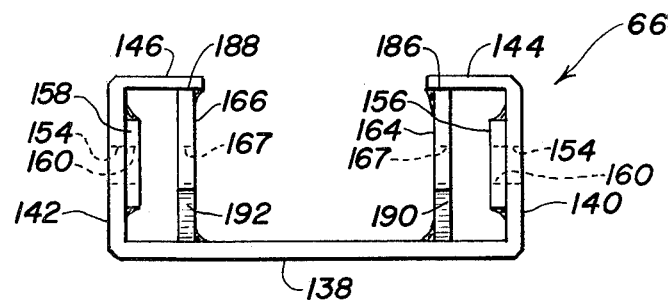

4,125,071

BALE SHAPE CONTROL MEANS

BACKGROUND OF THE INVENTION

1. Field of the Invention

The present invention relates generally to a baler and, more particularly, is concerned with improved means for controlling the shape of bales successively formed within and discharged from the bale chamber of the baler.

2. Description of the Prior Art

A conventional baler includes an elongated, fore-and-aft extending bale chamber within which bales are successively formed and moved toward a rear discharge end thereof. In order to form bales within the bale chamber having a desired level of density, it is common practice to provide spaced apart top and bottom rails for the bale chamber which are oriented fore-and-aft and pivotally mounted on the baler at their forward ends.

Under some baling conditions, such as in light crop materials, in order to be able to achieve the desired level of bale density, the rearward ends of the rails must be held closer to each other than the forward ends by an adjustable tension control device which is commonly provided on the bale chamber such that the rails converge toward one another at their rearward ends. Under such conditions, the bale chamber is provided with its shortest vertical dimension at the rear discharge end thereof which forms a restriction within the bale chamber to the passage of a bale through the discharge end thereof and forces the rearward ends of the top and bottom rails into the top and bottom surfaces of the bale. Because of the added effect of gravity, the rearward end of the top rail is forced deeper into the top surface of a bale discharging from the bale chamber than is the rearward end of the bottom rail into the bottom surface of the bale. Bales formed under such conditions emerge from the bale chamber in a distorted form or shape which causes problems in subsequent handling and storage of the bales.

SUMMARY OF THE INVENTION

The present invention provides for improved control of bale shape and thereby obviates the aforementioned problems associated with distorted bale shape. Specifically, substantially uniform and equal force is imposed on the bale along the length thereof after it has been banded and tied and as it emerges from the discharge end of the bale chamber which reduces any tendency toward bale shape distortion. Also, initial tension rail penetration into the top surface of the bale is provided forward of and remote from the discharge end of the bale chamber which further reduces the tendency toward bale distortion. Furthermore, a greater proportion of rail surface contact is maintained with the top surface of the bale which allows the desired level of bale density to be reached through the application of a reduced level of rail tension whereby excessive forcing of the top tension rail into the top surface of the bale is avoided and better bale shape is attained. As a consequence, the need for auxiliary restricting devices, such as hay wedges, in the rear portion of bale chamber is reduced or eliminated.

Accordingly, the present invention relates to means for improving control over the shape of bales successively formed within and moved toward the rear discharge end of the bale chamber or a baler, without sacrificing any degree of control over the ability to achieve a predetermined desired level of crop material density in the bales. The improved bale shape control means includes a top tension rail having front and rear portions, an elongated generally straight bottom tension rail and means on the bale chamber for effectuating disposition of the rear portion of the top rail in a position in which it is spaced above and substantially parallel to the bottom rail and disposition of the front portion of the top rail in a position in which it rearwardly declines toward the bottom rail. More particularly, the front and rear portions of the top tension rail are articulately interconnected together at their adjacent ends.

As bales are successively moved within the bale chamber toward the rear discharge end thereof, a forward section is defined in the bale chamber remote from its discharge end and between the bottom rail and the front portion of the top rail in which the successive bales are subjected to increasing compressive forces and a rear section is defined in the bale chamber extending from the front section to the discharge end thereof and between the bottom rail and the rear portion of the top rail in which the successive bales are subjected to substantially uniform or equal compressive forces.

The bale shape control means further includes means located at the respective adjacent, pivotally connected ends of the front and rear portions of the top rail which constitutes a stop limiting pivotal movement of the front and rear portions relative to each other to only toward and away from one side of a generally horizontal plane which faces toward the bottom rail and extends through the pivotally connected ends of the portions.

More particularly, the stop means includes a member fixed on one of the front and rear top rail portions and projecting therefrom at the end thereof adjacent the end of the other one of the portions. A part of the other one of the top rail portions overlies the projecting member and will abut the same when the top rail portions are pivoted relative to each other to form the generally horizontal plane extending through their pivotally connected ends.

The advantages and attainments of the improvement provided by the present invention will become apparent to those skilled in the art upon a reading of the following detailed description when taken in conjunction with the drawings in which there is shown and described an illustrative embodiment of the invention.

BRIEF DESCRIPTION OF THE DRAWINGS

In the course of the following detailed description reference will be frequently made to the attached drawings in which:

FIG. 6 is an enlarged, fragmentary top plan view of the articulated top tension rail of the bale chamber of FIG. 3, showing the pivotal connection between the front and rear members of the top rail;

FIG. 7 is an enlarged, fragmentary left side elevational view of FIG. 6;

FIG. 8 is a front end elevational view of the rear member of the top rail; and

FIG. 9 is a rear end elevational view of the front member of the top rail.

DETAILED DESCRIPTION OF THE INVENTION

In the following description, right hand and left hand references are determined by standing at the rear of the baler and facing in the direction of forward travel. Also, in the following description, it is to be understood that such terms as "forward," "rearward," "left," "upwardly," etc., are words of convenience and are not to be construed as limiting terms.

IN GENERAL

Figure 1:
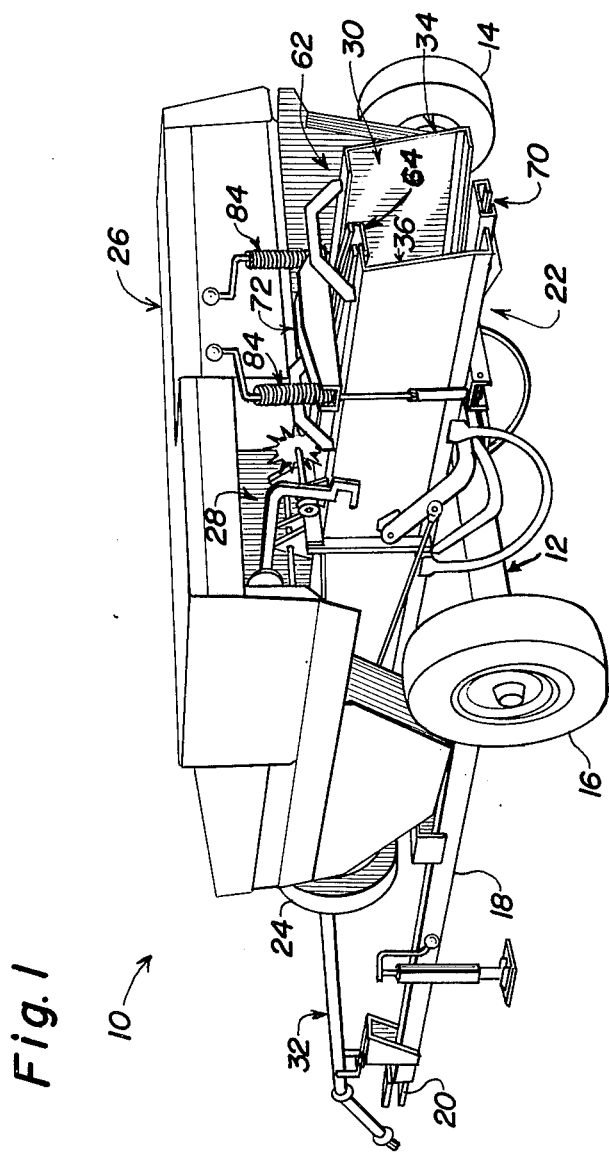
FIG. 1 is a perspective view of a baler embodying the principles of the present invention.

Referring now to the drawings, and particularly to FIG. 1, there is shown a hay baler, being indicated generally by numeral 10 and incorporating the preferred embodiment of the improvement provided by the present invention. The baler 10 includes a frame 12 supported and made mobile by right and left rotatably mounted ground-engaging wheels 14,16. The baler has a tongue 18, being pivotally connected to the frame 12 and extending forwardly of the baler. When articulately connected at a hitch end 20 of its tongue 18 to the drawbar of a tractor (not shown), the baler 10 may be towed across a field.

The baler 10 further includes a fore-and-aft extending bale case or chamber 22 located along the left side of the frame 12 having a forward end on which a flywheel 24 is rotatably mounted. Also, included on the baler 10 is a feeder housing 26 transversely mounted on the frame 12 adjacent the right side of the bale chamber 22 within which is mounted a conventional feeding mechanism (not shown) adapted to convey crop material into the bale chamber 22 through an inlet opening (not shown) defined in the bale chamber's right side contiguous with the left end of the feeder housing 26. A pickup assembly (not shown) is mounted on the frame 12 and positioned forwardly of and below the feeder housing 26 and adapted to lift crop material from the field and deliver it to the feeding mechanism.

A plunger (not shown) is mounted for reciprocable movement in the forward portion of the bale chamber 22 for forming the crop material conveyed therein through the inlet opening into rectangular bales. As the bales are successively formed within the bale chamber 22, they are moved progressively toward the rear end of the bale chamber 22. As each bale is completed, it is banded with a suitable medium and tied by tying mechanism, generally designated 28, being mounted on the bale chamber 22. Once completed, each bale soon emerges from the rear or discharge end, generally designated 30, of the bale chamber 22.

An input driveline, generally designated 32, being connected at its rear end to the baler flywheel 24, is adapted for connection at its forward end to the power takeoff (pto) shaft of the tractor for rotation in unison therewith to supply rotary driving power to the operating components of the baler 10 through additional power transmitting components (not shown).

THE BALE CHAMBER OF THE BALER

Figure 2:
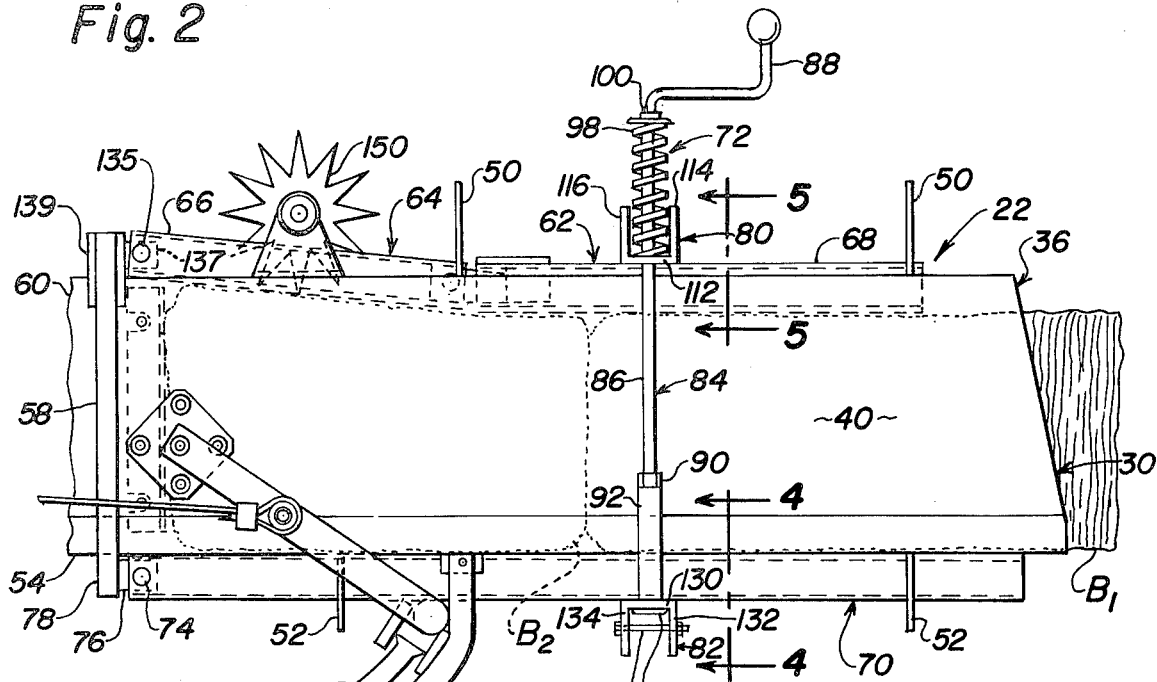
FIG. 2 is an enlarged, fragmentary left side elevational view of the rear portion of the bale chamber of the baler of FIG. 1.
Figure 3:
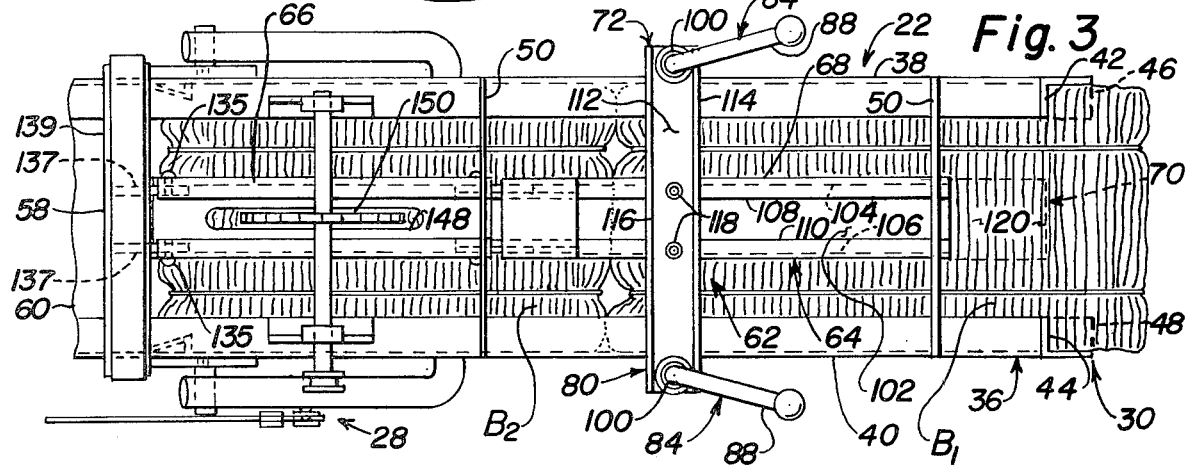
FIG. 3 is a top plan view of the bale chamber of FIG. 2.

Referring still to FIG. 1, and more particularly to FIGS. 2 and 3, there is illustrated in detail the rear portion of the bale chamber 22 through which the completed bales successively move toward the discharge end 30. Such portion of the bale chamber 22 is generally rectangular in cross-section and defined in part by laterally spaced, generally parallel side members 34,36. As illustrated, the side members 34,36 respectively define vertically disposed sidewalls 38,40 and are channel shaped, respectively having inturned horizontal flanges 42,44 adjacent the respective upper edges of the sidewalls 38,40 and similar inturned horizontal flanges 46,48 adjacent the respective lower edges of the sidewalls 38,40, which corresponding flanges respectively define portions of the top and bottom walls of the rear portion of the bale chamber 22. The side members 34,36 are disposed in substantially parallel relationship by upper and lower pairs of spaced apart rigid arched braces 50,52 which respectively extend transversely across the bale chamber 22 and are fixedly attached to and extend between upper and lower flanges 42,44 and 46,48.

In the forward portion of the bale chamber 22 in which charges of crop material are formed into bales, the bottom of the bale chamber 22 is substantially closed by sheet metal structure 54 except for fore-and-aft extending slots (not shown) formed therein which allow entry into the bottom of the bale chamber 22 of needles 56 of the bale tying mechanism 28. The top of the bale chamber 22 forwardly of a collar- or box-like mounting frame 58, which is attached about the bale chamber 22 to its side members 34,36, is also substantially closed by sheet metal structure 60 except for fore-and-aft slots (not shown) which allow the tip portions of the respective needles 56 to emerge from the top of the bale chamber 22 and deliver portions of the banding medium to other components of the typing mechanism 28 being supported above this portion of the bale chamber 22.

As mentioned previously, crop material to be baled is fed into the forward portion of the bale chamber 22 through an inlet opening (not shown) defined in the bale chamber's right side contiguous with the left end of the feeder housing 26. Successive charges of material so fed into the bale chamber 22 are compacted into a bale by the plunger (not shown) which reciprocates fore-and-aft within the forward portion of the bale chamber 22 and past the inlet opening therein. As seen in FIGS. 2 and 3, the rear portion of the bale chamber 22 is sufficient in length to accommodate two previously formed and tied bales $B_1$, $B_2$ while another bale is being formed in the forward position of the bale chamber 22. The forward end of bale $B_2$ thus, in effect, serves as the end wall of the bale chamber 22 against which the crop material being formed into the new bale (not shown) is compressed. As the new bale is formed, both completed bales $B_1$, $B_2$ are gradually pushed rearwardly in increments upon each working stroke of the plunger toward the discharge end 30 of the bale chamber and eventually emerge therefrom.

IMPROVED BALE SHAPE CONTROL MEANS

Movement of the bales $B_1$, $B_2$ through the bale chamber 22 toward the discharge end 30 thereof is resisted by the improved means of the present invention, being associated with the bale chamber 22 and generally designated by numeral 62 in FIGS. 1 through 3. Means 62 allows the achievement of a desired level of density of crop material in the bale being formed in the forward portion of the bale chamber 22 while, at the same time, providing improved control over the shape of the completed bales $B_1$, $B_2$ as they successively move through the rear portion of the bale chamber 22 and emerge from the discharge end 30 thereof.

The improved bale shape control means 62 basically includes an improved top tension rail 64 having front and rear portions 66,68, a conventional elongated bottom tension rail 70 and conventional tension control means 72 on the bale chamber 22 for effectuating a novel disposition of the improved top rail 64 relative to the conventional bottom rail 70.

Heretofore, the bale chamber of a baler has been provided with a generally straight bottom tension rail which forms the central portion of the bottom wall of the bale chamber. Similarly, bottom tension rail 70 extends between the lower inturned horizontal flanges 46,48 on the side members 34,36 of the bale chamber 22 to form a central portion of the bottom thereof. The bottom rail 70 is pivotally connected for vertical movement about a horizontal axis at its forward end by pins 74 (only the left one being seen in FIG. 3) to a pair of spaced apart brackets 76 (only the left one being shown in FIG. 3) attached on and projecting rearwardly from a lower transverse portion 78 of the collar-like mounting frame 58.

Also, heretofore, a tension control mechanism substantially identical to means 72 has been provided on the bale chamber of a baler. Tension control means 72 includes upper and lower channel membes 80,82 being respectively disposed above and below, and extending transversely across, the bale chamber 22. The corresponding opposite end portions of the upper and lower transverse channel members 80,82 are respectively interconnected by identical adjustment devices 84.

Each of the devices 84 includes a vertically-extending rod 86 being received through an opening formed in the respective end portion of the upper transverse channel member 80 and having an integral crank 88 at an upper end of the rod 86 by which the rod may be rotated manually. The lower end portion of the rod 86 remote from its crank end is threaded and screwed through a nut element 90 being fixed on the upper end of a vertically-disposed sleeve 92 which is received through an opening formed in the respective end portion of the lower transverse channel member 82. The lower end of the sleeve 92 below the lower channel member 82 has a head 94 formed thereon which retains the sleeve 92 through the opening in the respective lower channel member end. Also, a bolt 96 fastened through the lower channel member end below the sleeve head 94 limits downward movement of the sleeve 92 relative to the lower channel member 82.

Each of the devices 84 further includes a coiled spring 98 received about the rod 86 and confined between the top surface of the respective end of the upper channel member 80 and a collar 100 being fixed on the rod 86 adjacent to and below the crank 88 on the rod 86, whereby clockwise rotation of the crank 88, as viewed in FIG. 3, screws the rod 86, into the sleeve nut element 90 and increasingly compresses the spring 98 which thereby forces the upper and lower channel members 80,82 toward each other. On the other hand, counterclockwise rotatin of the crank 88 screws the rod 86 out of the nut element 90 and increasingly relaxes the spring 98 which thereby allows the members 80,82 to separate or move away from each other.

Heretofore, it has been common practice to provide a generally straight elongated top tension rail on the bale chamber of a baler which is pivotally mounted at its forward end about a horizontal axis for vertical movement. The tension control mechanism has been commonly provided on the bale chamber adjacent the rear discharge end thereof so as to resist the movement of completed bales therethrough by holding the rear ends of the top and bottom straight tension rails closer together than the forward ends thereof. In so doing, the tension control mechanism causes the rails to converge toward one another at rearward ends. As mentioned earlier, bales formed under such conditions emerge from the bale chamber in a distorted form or shape which causes problems in subsequent handling and storage of the bales.

Figure 4:
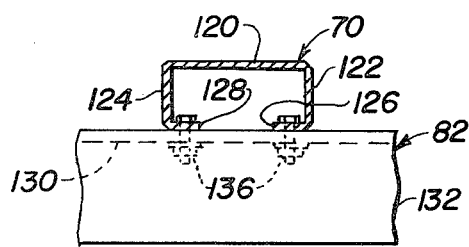
FIG. 4 is a fragmentary rear elevational view taken along line 4—4 of FIG. 2.
Figure 5:
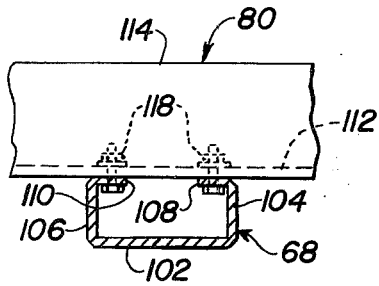
FIG. 5 is a fragmentary rear elevational view taken along line 5—5 of FIG. 2.

The improved compound top tension rail 64 of the present invention replaces the above-referred to conventional straight top tension rail and the tension control means 72 is relocated forwardly of the discharge end 30 of the bale chamber 22. The upper transverse channel member 80 of the tension control means 72 is located at an intermediate position between the opposite ends of the rear portion 68 of the improved top tension rail 64 and above the rear portion 68. The top rail rear portion 68 is formed by a bale-engaging base 102 which merges at its opposite longitudinal edges into respective spaced apart upstanding sides 104,106 respectively having upper inturned horizontal flanges 108,110. The upper channel member 80 is U-shaped having a base 112 with upstanding spaced apart sides 114,116 respectively merging from the opposite longitudinal edges of the base 112. As seen in FIGS. 3 and 5, the top rail rear portion 68 is attached to a mid-section of the upper channel member by a pair of bolts 118 which respectively clamp the inturned flanges 108,110 of top rail rear portion 68 to the base 112 of upper channel member 80. The lower transverse channel member 82 of the tension control means 72 is located in a position aligned below that of the upper channel member 80 and across and below the bottom tension rail 70. The bottom rail 70 is formed by a bale-engaging base 120 which merges at its opposite longitudinal edges into respective spaced apart sides 122,124 which depend from the base 120 and respectively have lower inturned horizontal flanages 126,128. The lower channel member 82 is U-shaped having a base 130 with depending spaced apart sides 132,134 respectively merging from the opposite longitudinal edges of the base 130. As seen in FIG. 4, the bottom tension rail 70 is attached to a mid-section of the lower channel member 82 by a pair of bolts 136 which respectively clamp the inturned flanges 126,128 of the bottom tension rail 70 to the base 130 of the lower channel member 82.

As seen in FIG. 2, normally the devices 84 of the tension control means 72 are similarly adjusted so as to effectuate disposition of the rear portion 68 of the improved top tension rail 64 in a position in which it is spaced above and substantially parallel to the bottom tension rail 70, and in so doing, the tension control means 72 causes the front portion 66 of the improved top tension rail 64 to be disposed in a position in which it rearwardly declines toward the bottom tension rail 70. In such manner, as bales $B_1$, $B_2$ are successively moved within the rearward portion of the bale chamber 22 toward the discharge end 30 thereof, a forward section is defined in the bale chamber rearward portion remote from discharge end 30 and between the bottom rail 70 and the front portion 66 of the top rail 64 in which the successive bales are subjected to increasing compressive forces by the rails and a rear section is defined in the bale chamber rearward portion extending from the front section to the discharge end 30 thereof and between the bottom rail 70 and the rear portion 68 of the top rail 64 in which the successive bales are subjected to substantially uniform or equal compressive forces by the rails.

Through the above-described positional relationship between the top and bottom rails 64,70, referring to FIG. 2 it will be readily understood that initial tension rail penetration into the top surface of each of the successive bales occurs near the rear end of the forward portion 66 of the top rail 64 and thus forward of and remote from the discharge end 30 of the bale chamber 22 which reduces the tendency toward bale distortion which occurred heretofore due to rail penetration at the discharge end of the bale chamber. Furthermore, through the above-described positional relationship between the rails 64,70, it will be realized that a greater proportion of rail surface contact is maintained with the top surface of each of the successive bales by the bale-engaging base 102 of the rear portion 68 of the top tension rail 64 which allows the desired level of bale density to be reached in the bale being formed in the forward portion of the bale chamber 22 through the application of a level of rail tension which is less than that necessary heretofore whereby excessive forcing of the top tension rail into the top surface of the bale is avoided and better bale shape is attained.

The front and rear portions 66,68 of the improved compound top tension rail 64 are preferably articulately interconnected together. The front portion of the top rail 64 is also pivotally connected for vertical movement about a horizontal axis at its forward end by pins 135 to a pair of spaced apart brackets 137 attached on and projecting rearwardly from an upper transverse portion 139 of the collar-like mounting frame 58.

Referring to FIGS. 6, 7 and 9, it will be seen that the front top rail portion 66 is formed by a bale-engaging base 138 which merges at its opposite longitudinal edges into respective spaced apart upstanding sides 140,142 respectively having upper inturned horizontal flanges 144,146. The base 138 has an elongated slot 148 formed therein through which extends a metering wheel 150 of the tying mechanism 28.

The rear end portions of the sides 140,142 of the top rail front portion 66 each have a square opening 152 formed therein for receiving therethrough and seating therein a carriage bolt 154. Plates 156,158 are respectively welded to the interior surfaces of the rear end portions of the sides 144,146 and each have a circular opening 160 defined therethrough being aligned with the square opening 152 and receiving the threaded stem 162 of the bolt 154. Stop members 164,166, each in the form of a flat plate, are vertically disposed between, and welded to, the upper surface of the base 138 of the top rail front portion 66 and respective lower surfaces of the inturned flanges 144,146 at locations similarly spaced inwardly from the respective plates 156,158. Each of the stop members 164,166 have a circular opening 167 formed therein aligned with the openings 152,160 of the plates 156,158 and sides 140,142.

Referring to FIGS. 6, 7 and 8, the front end portions of the sides 104,106 of the top rail rear portion 68 respectively have tabs 168,170 with respective forward parts 172,174 thereof being welded to the interior surfaces of the sides 104,106. Tabs 168,170 project inwardly toward each other rearwardly from the top rail front portion 68 to respective rear parts 176,178 which are thereby inwardly offset from the corresponding forward parts 172,174 such that the rear parts 176,178 will be disposed between the respective stop members 164,166 and plates 156,158 and in close side-by-side relationship with the plates 156,158. Each of the rear parts 176,178 have a circular opening 180 formed therein which may be aligned with the aforementioned openings 152,160,167 of the plates 156,158, sides 140,142 and stop members 164,166.

When the carriage bolts 154 are received through the various openings, as shown in FIGS. 6 and 7, and respective nuts 182 are threadably fastened thereon, the front and rear portions 66,68 of the top rail 64 are pivotally coupled together.

The stop members 164,166 project rearwardly from the top rail front portion 66 and are received by the front end portion of the top rail rear portin 68 respectively between upper inturned flanges 108,110 and the base 102 of the top rail rear portion 68. A flat plate 184 bridges the flanges 108,110 and is welded thereto for purposes of strengthening or reinforcing the top rail rear portion 68 in this area. The rearwardly projecting portions of the stop members 164,166 respectively have upper horizontal edges 186,188 and lower rearwardly and upwardly tapered edges 190,192 which together with the interior surfaces of the inturned flanges 108,110 and the base 102 of the top rail rear portion 68 define the upper and lower limits for pivotal movement of the top rail front and rear portions 66,68 relative to each other. The portions 66,68 may only pivot upwardly until upper edges 186,188 of stop members 164,166 abut inturned flanges 108,110 and may only pivot downwardly until lower tapered edges 190,192 of stop members 164,166 abut base 102. When upper edges 186,188 of stop members 164,166 engage inturned flanges 108,110, the portions 66,68 are disposed in a generally horizontal plane extending along the top of the side members 38,40 of the base chamber 22. Thus, the top rail is prevented from possibly raising out of the area of the bale chamber 22. Consequently, the portions 66,68 of the top rail may only pivot toward and away from the lower side of the aforementioned horizontal plane which faces toward the bottom rail 70 and generally extends through the pivotally connected ends of the portions 66,68. The only significance attached to the lower limit established by the tapered edges on stop members 164,166 is that the taper thereof be sufficient to accommodate a desired amount of downward articulation of the portions 66,68 relative to each other.

It is thought that the invention and many of its attendant advantages will be understood from the foregoing description and it will be apparent that various changes may be made in the form, construction and arrangement of the parts of the improved bale shape control means described without departing from the spirit and scope of the invention or sacrificing all of its material advantages, the form hereinbefore described being merely an exemplary embodiment thereof.

Having thus described the invention, what is claimed is:

1. Improved bale shape control means for a baler bale chamber within which bales are successively formed and moved toward a rear discharge end thereof, comprising:
   a top tension rail having front and rear portions articulately interconnected together;
   an elongated, generally straight bottom tension rail; and means on said bale chamber for effectuating disposition of said rear portion of said top rail in a position in which it is spaced above and substantially parallel to said bottom rail and disposition of said front portion of said top rail in a position in which it rearwardly declines toward said bottom rail.

2. Improved bale shape control means as recited in claim 1, wherein
the articulate connection between said front and rear portions of said top rail is a pivot connection at their respective adjacent ends; and
means is located at said respective adjacent, pivotally connected ends of said front and rear portions which constitutes a stop limiting pivotal movement of said front and rear portions relative to each other to only toward and away from one side of a generally horizontal plane which faces toward said bottom rail and extends through said pivotally connected ends.

3. Improved bale shape control means as recited in claim 3, wherein said means which constitutes a stop includes:
a member fixed on one of said front and rear portions of said top rail and projecting therefrom at said end thereof adjacent the end of said other one of said portions; and
a part of said other one of said portions which overlies said member and will abut the same when said portions are pivoted relative to each other to form said generally horizontal plane.

4. In a baler including an elongated bale chamber having a bottom and within which bales are successively formed and moved toward a discharge end thereof, the improvement which comprises:
a compound member forming a top for said bale chamber and including a front portion and a rear portion, said front portion having a forward end which is pivotally mounted on said baler and a rearward end which is pivotally connected to a forward end of said rear portion of said compound member; and
means interconnecting said rear portion of said compound member with said bale chamber so as to dispose said rear portion in a position in which it is spaced above and substantially parallel to said bottom and dispose said front portion of said compound member in a position in which it rearwardly declines toward said bottom whereby a forward section is defined in said bale chamber remote from its discharge end and between said bottom thereof and said front portion of said compound member in which said bales are subjected to increasing compressive forces as the same are successively moved therethrough toward said discharge end, while a rear section is defined in said bale chamber extending from said front section to said discharge end thereof and between said bottom thereof and said rear portion of said compound member in which said bales are subjected to substantially uniform compressive forces as the same are successively moved therethrough toward said discharge end.

5. In a baler including an elongated bale chamber within which bales are successively formed and moved toward a discharge end thereof, said chamber having a pair of laterally spaced, substantially parallel side members, upper and lower cross members located remote from said discharge end and respectively extending between and secured to the upper and lower edges of said side wall members and an elongated bottom wall member disposed generally between said lower edges of said side wall members and connected to said lower cross member, the improvement which comprises:
a compound top wall member disposed generally between said upper edges of said side wall members and including a front portion and a rear portion, said front portion being pivotally connected at a forward end to said upper cross member and at a rearward end to a forward end of said rear portion; and
means interconnecting said bottom wall member and said rear portion of said compound top wall member so as to dispose the same substantially parallel to each other with said front portion of said compound member declining rearwardly toward said bottom wall member, whereby a forward section is defined in said bale chamber remote from its discharge end and between said bottom wall member, said side wall members and said front portion of said compound top wall member in which said bales are subjected to increasing compressive forces as the same are successively moved therethrough toward said discharge end, while a rear section is defined in said bale chamber extending from said front section to said discharge end thereof and between said bottom wall member, said side wall members and said rear portion of said compound top wall member in which said bales are subjected to substantially uniform compressive forces as the same are successively moved therethrough toward said discharge end.

* * * * *